(12) United States Patent
Jen et al.

(10) Patent No.: US 7,423,620 B2
(45) Date of Patent: Sep. 9, 2008

(54) METHOD FOR ELIMINATING FLICKERS OF LIQUID CRYSTAL DISPLAY

(75) Inventors: Tean-Sen Jen, Pingjhen (TW); Ming-Tien Lin, Lujou (TW); Deuk-Su Lee, Yang Mei (TW); Ta-Wei Tseng, Yunghe (TW)

(73) Assignee: Hannstar Display Corporation, Taipei (TW)

( * ) Notice: Subject to any disclaimer, the term of this patent is extended or adjusted under 35 U.S.C. 154(b) by 595 days.

(21) Appl. No.: 10/964,803

(22) Filed: Oct. 13, 2004

(65) Prior Publication Data

US 2005/0264517 A1  Dec. 1, 2005

(30) Foreign Application Priority Data

Nov. 19, 2003  (TW) .............................. 92132464 A (51) Int. Cl.
  *G09G 3/36* (2006.01)
  *G02F 1/1343* (2006.01)
(52) U.S. Cl. .............................. 345/90; 345/87; 345/93; 345/205; 349/38
(58) Field of Classification Search ........... 345/55–100, 345/204–214, 690–699; 349/38–39
See application file for complete search history.

(56) References Cited

U.S. PATENT DOCUMENTS

| | | | | |
|---|---|---|---|---|
| 6,028,650 | A | * | 2/2000 | Kuroha et al. ................. 349/38 |
| 6,738,106 | B1 | * | 5/2004 | Tanahara et al. .............. 349/38 |
| 6,982,775 | B2 | * | 1/2006 | Lee et al. ....................... 349/39 |

* cited by examiner

*Primary Examiner*—David L Lewis
(74) *Attorney, Agent, or Firm*—Egbert Law Offices (57) ABSTRACT

The screen of a liquid crystal display is first divided into a compensation portion, a compensation transition portion and a non-compensation portion in a sequence arranged along the scanning line. Then storage capacitor areas of the pixels in the non-compensation portion are made equal, whereas the difference between the storage capacitor area of the pixel in the compensation portion and that in the non-compensation portion is set to one constant basic compensation area. Afterward, the average of the storage capacitor areas of the pixels on each data line in the compensation transition portion progressively varies along the scanning line, where the average is greater than or equal to any of the storage capacitor areas of the pixels in the non-compensation portion. The direction of the scanning line is designated as either the direction in which scanning signals are transmitted or the direction opposite thereto.

28 Claims, 10 Drawing Sheets

METHOD FOR ELIMINATING FLICKERS OF LIQUID CRYSTAL DISPLAY

RELATED APPLICATION

This application claims priority from Taiwan application Ser. No. 092132464, entitled "Method for Eliminating Flickers of Liquid Crystal Display", filed on Nov. 19, 2003 by Tean-Sen Jen, Ming-Tien Lin, Deuk-Su Lee and Ta-Wei Tseng, which application is incorporated herein in the entirety by this reference thereto.

BACKGROUND OF THE INVENTION

1. Field of the Invention

The present invention relates to a method for eliminating flickers of a liquid crystal display (LCD), and more particularly to a method for the elimination of flickers by adjusting the areas of storage capacitors.

2. Description of the Related Art

Figure 1:
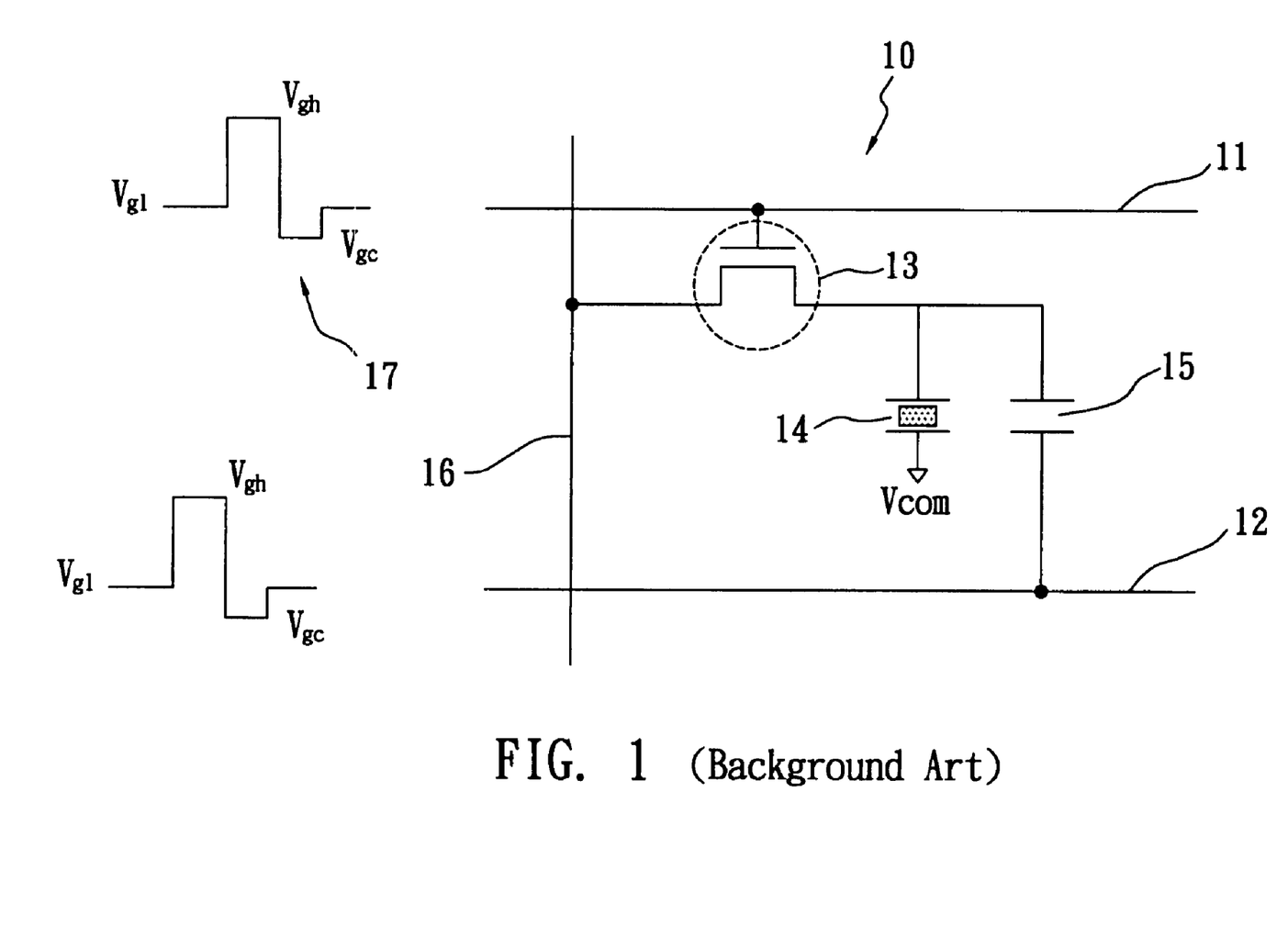
FIG. 1 is a circuit diagram of a pixel to which a scanning signal is applied.

Three-level capacitive coupling driving is a driving method often applied to a liquid crystal display for the time being. According to the driving method, there are three different levels for the scanning signals 17 working on the scanning lines 11, namely $V_{gh}$, $V_{gl}$ and $V_{gc}$, as shown in FIG. 1, wherein the thin film transistor 13 of the pixel 10 is turned on at level $V_{gh}$ and turned off at level $V_{gl}$. If the thin film transistor 13 is on, the data signals working on the data lines 16 are written into the liquid-crystal capacitor 14. The gate pulse compensation level $V_{gc}$ works on the scanning lines 12 to enable the storage capacitor 15 to generate a coupled voltage. The coupled voltage is intended to compensate for the voltage drop in the voltage level of the liquid crystal capacitor 14 with a view to eliminating flickers that may otherwise result from the voltage drop.

Figure 2:
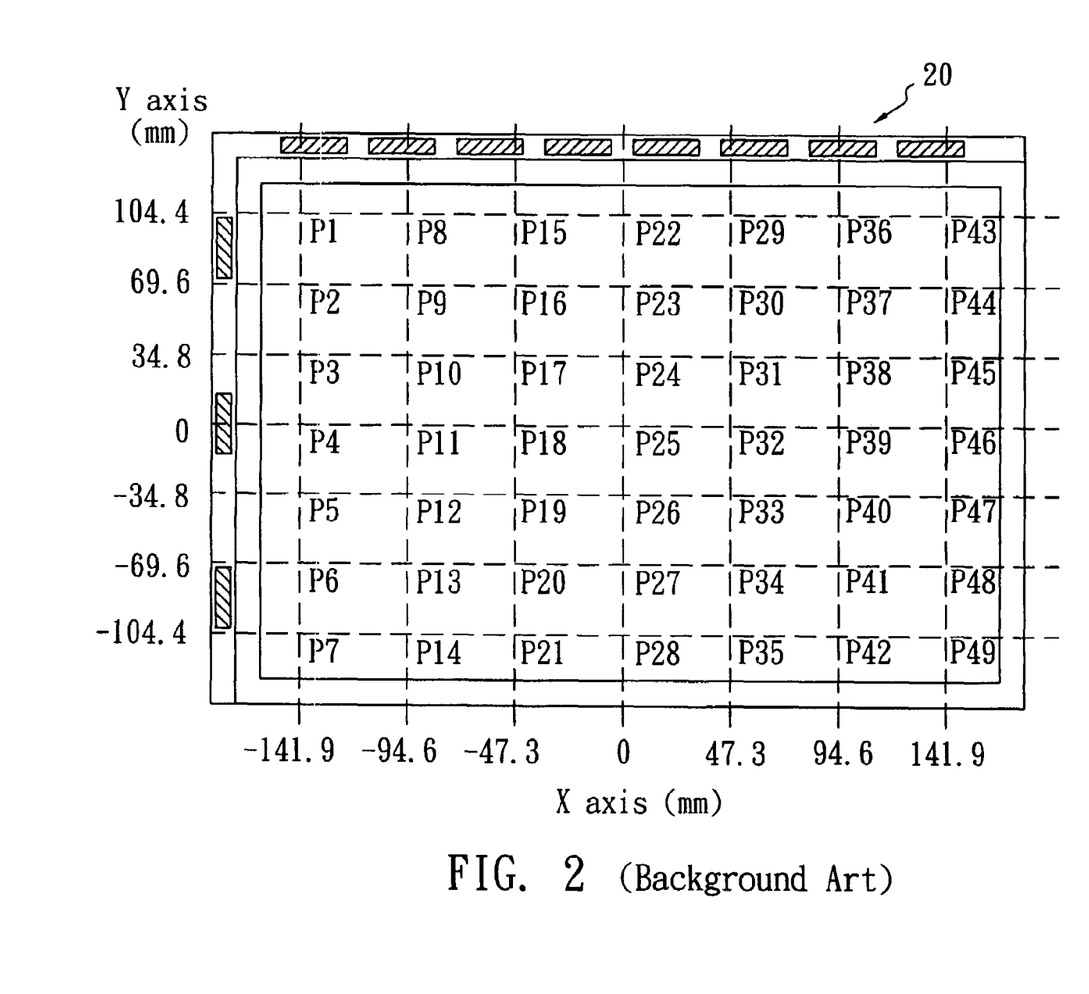
FIG. 2 is a schematic diagram of the sampling pixels for calculating the distribution of flicker levels on a liquid crystal display.

In order to measure the flicker levels of the liquid crystal display 20, positions of a plurality of pixels P1-P49 arranged in a grid-point matrix are shown on the panel, as shown in FIG. 2. Then the flicker levels appearing on the pixels at each grid-point are measured with an optical measuring instrument. The positions of the pixels are defined by the readings shown on the x-axis and y-axis in the figure.

Figure 3:
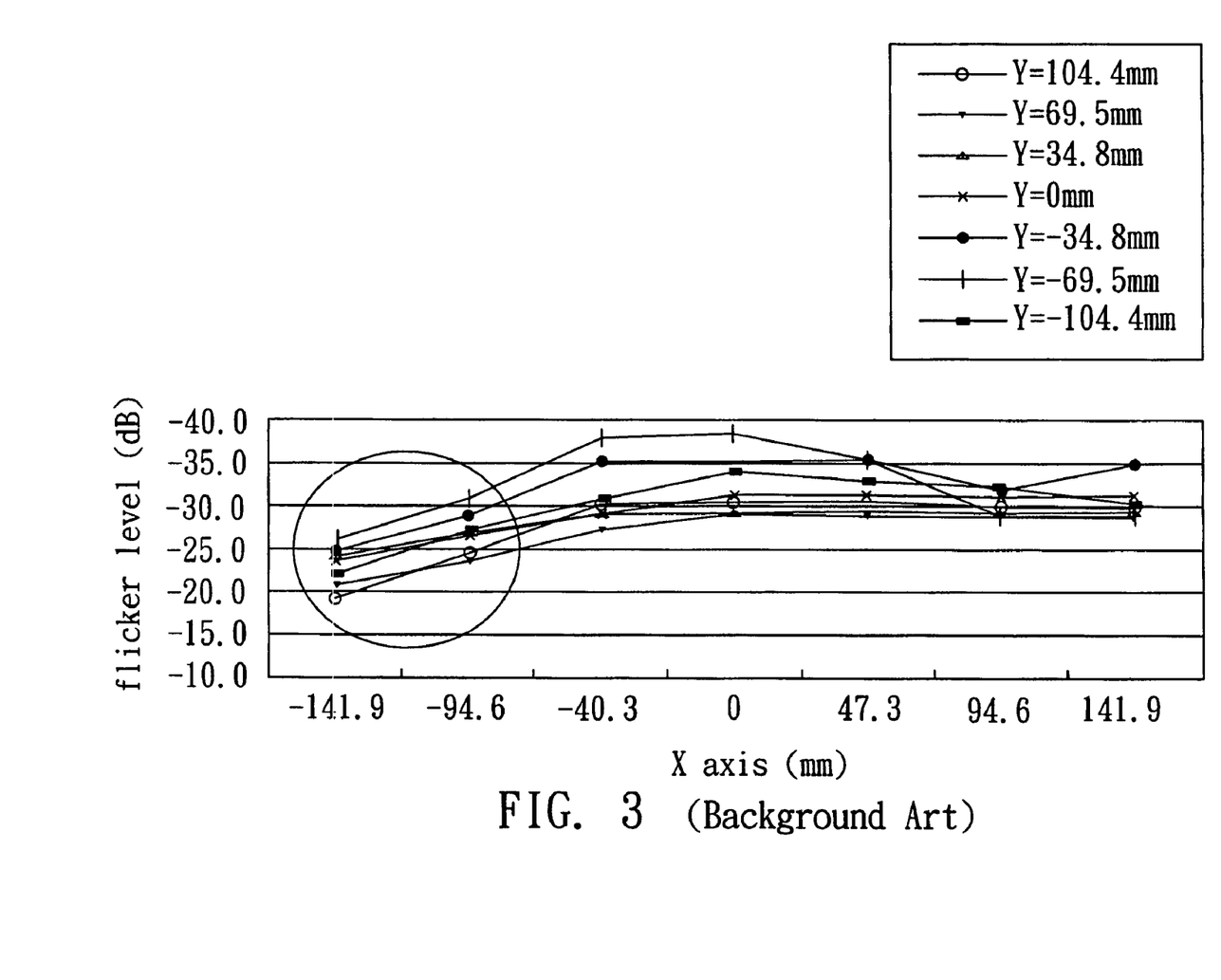
FIG. 3 is a graph of the distribution of flicker levels on a conventional liquid crystal display.

FIG. 3 is a diagram of the distribution of the measurements related to the flicker levels of the pixels P1-P49 in FIG. 2. As regards the liquid crystal display 20, the flickers occurring in the pixels at the center and the right portion separately measure approximately −30 dB or less in the flicker level, but those at the left portion (as indicated by the marks found in the circle) mostly measure more than −30 dB in the flicker level. Since flickers that measure approximately −30 dB or less in the flicker level are invisible to the naked eye, it is believed that no flicker exists in the pixels either at the center portion or at the right portion but most of the pixels at the left portion have flickers that are perceptible.

Figure 4:
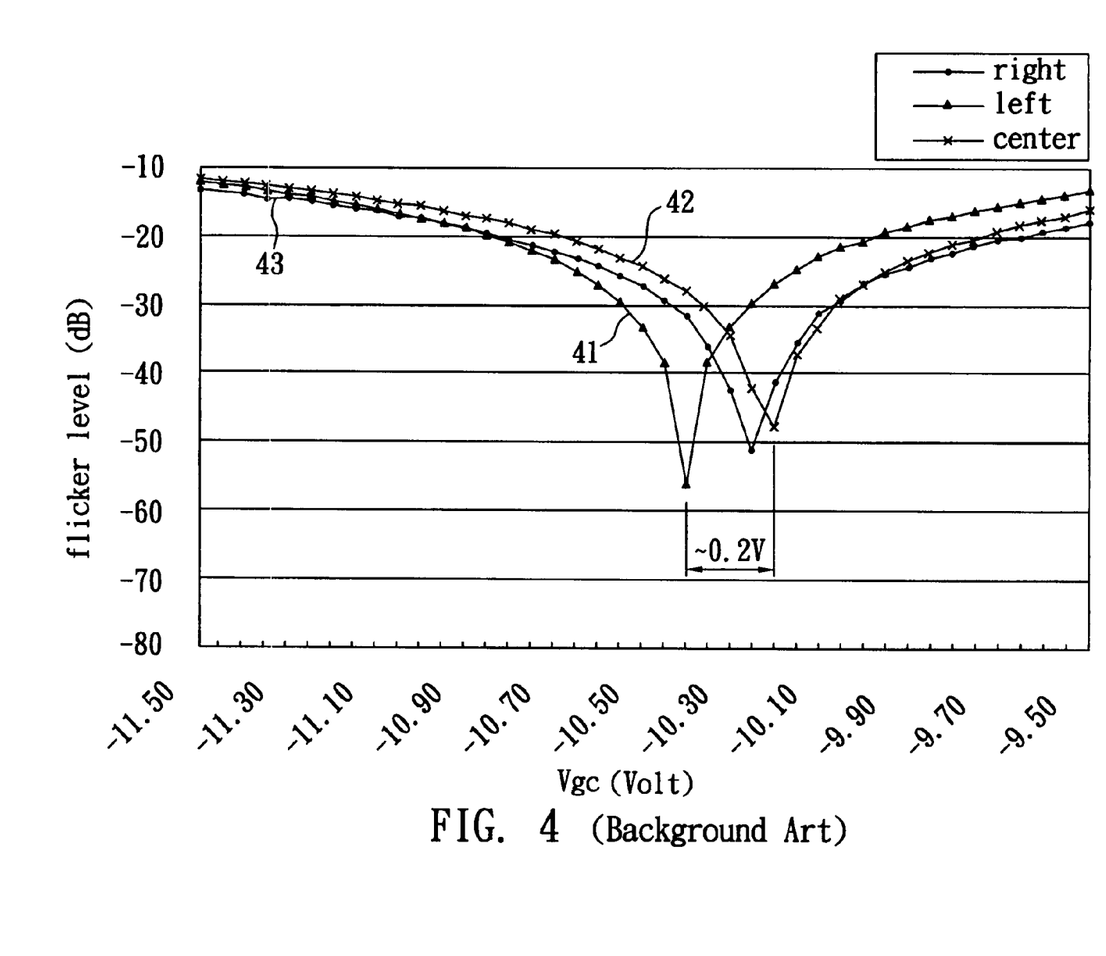
FIG. 4 is a graph of the variations of the flicker levels respectively regarding the left, center and right portions of the screen in response to the a variable level $V_{gc}$ in accordance with the present invention.

In general, one may adjust the level $V_{gc}$ for a liquid crystal display by turning the knob of a variable resistor, and solve the flicker problem of the screen by varying the level $V_{gc}$. Unfortunately, it is impossible to solve the flicker problem of the screen by means of one single level $V_{gc}$, as verified with a test conducted on the three curves 41, 42 and 43 shown in FIG. 4. The three curves are plotted using the measurements about the flicker levels appearing on selected pixels on the left, center, and right portion of the liquid crystal display respectively, where the pixels selected for such a purpose are limited to a certain area of each of the three above-mentioned portions. By changing the level $V_{gc}$ of the transverse axis, one draws the curves to describe the variable flicker level of the pixels in the three portions. Since the transverse axis readings (−10.10V) that correspond to minimum readings shown on the respective lengthwise axis of the curves 42 and 43 are roughly equal in magnitude, flickers appears on pixels at the center as well as those on the right portion can be eliminated at the same level $V_{gc}$ that is, −10.10V. As shown in FIG. 4, at a level $V_{gc}$ equal to −10.10V, the flicker level described by the curve 41 is greater than −30 dB, thus it is impossible to eliminate flickers appearing on the pixels at the left portion using the same voltage level. Since the transverse axis reading that corresponds to the minimum reading shown on the lengthwise axis of the curve 41 is −10.30V, the difference between it and the above-mentioned transverse axis reading that corresponds to minimum readings shown on the respective lengthwise axes of the curves 42 and 43 is 0.2V approximately.

In short, conventional technology fails to address the flicker problem of the screen of a liquid crystal display using one single adjustable level $V_{gc}$, thus there is great demand for a method intended to solve the flicker problem of a liquid crystal display.

SUMMARY OF THE INVENTION

An objective of the present invention is to provide a method for eliminating flickers that may otherwise appear on the screen of a liquid crystal display, wherein the method involves adjusting the compensation area or the capacitance of a storage capacitor so as to eliminate flickers that may otherwise appear on the screen because of an RC delay.

The second objective of the present invention is to provide a method for fuzzing the difference between the hue gradation of different portions, wherein a transition portion is interposed between the respective portions having storage capacitors whose compensation areas differ, so as to gradually blur the displayed hue discontinuation caused by a sudden variation in the storage capacitor area.

The present invention discloses a method for eliminating flickers of a liquid crystal display (LCD). First, the screen is divided into a compensation portion, a compensation transition portion and a non-compensation portion in a sequence arranged along the scanning line. Then storage capacitor areas of the pixels in the non-compensation portion are made equal, whereas the difference between the storage capacitor area of the pixel in the compensation portion and that in the non-compensation portion is set to one constant basic compensation area. Afterward, the average of the storage capacitor areas of the pixels on each data line in the compensation transition portion progressively varies along the scanning line, where the average is greater than or equal to any of the storage capacitor areas of the pixels in the non-compensation portion. The direction of the scanning line is designated as either the direction in which scanning signals are transmitted or the direction opposite thereto.

BRIEF DESCRIPTION OF THE DRAWINGS

The invention will be described according to the appended drawings in which.

PREFERRED EMBODIMENT OF THE PRESENT INVENTION

In order to address the drawback of conventional technology, that is, as it is impossible to eliminate flickers from a screen using one single adjustable level $V_{gc}$, the present invention is designed in such a way that an adjustment is made in the storage capacitor areas of the pixels on the left portion in the hope of equalizing the transverse axis reading to which the minimum readings on the lengthwise axes for the curves 41, 42 and 43 in FIG. 4 correspond, so that flickers are eliminated from the screen using one single adjustable level $V_{gc}$. The basic compensation area of the storage capacitors disposed on the left portion is figured out with the following equation in accordance with the present invention.

$$\Delta C_{st} = \left( \frac{V_{gl} - V_{gc(left)}}{V_{gl} - V_{gc(center)}} - 1 \right) \times C_{st} \quad \text{(Formula 1)}$$

where $V_{gl}$ denotes the low level at which a thin film transistor is switched off using three-level driving signals, and $V_{gc(left)}$ denotes the transverse axis reading to which the minimum reading on the lengthwise axis for the curve 41 in FIG. 4 corresponds, and $V_{gc(center)}$ denotes the transverse axis reading to which the minimum reading on the lengthwise axis for the curve 42 in FIG. 4 corresponds. Hence, the following equation shows their relationship:

$$V_{gc(center)} - V_{gc(left)} \approx 0.2V$$

where $C_{st}$ denotes the storage capacitance of a conventional liquid crystal display, and the storage capacitance of the pixel of an conventional liquid crystal display is set to a constant value. The storage capacitance is obtained from the following equation:

$$C_{st} = \varepsilon \frac{A}{d}$$

wherein A is the area of the storage capacitor, $\varepsilon$ is a permittivity, and d is the distance between the two terminals of the storage capacitor.

Because $\varepsilon$ and d are constants for a general liquid crystal display, $C_{st}$ is in direct proportion to A. Hereinafter, the storage capacitance $C_{st}$ is directly represented by the storage capacitor area A rather than $\varepsilon$ and d. But, the scope of the present invention is not limited by the simplified relation.

Given $C_{st} = 2045\ \mu m^2$, the aforesaid Formula 1 yields the equation $\Delta C_{st} = 100\ \mu m^2$ by substitution. However, it is feasible to set the basic compensation area $\Delta C_{st}$ to 105 $\mu m^2$ for the sake of an uncomplicated circuit layout. Hence, the storage capacitor area of the pixels on the left portion is $C_{st} + \Delta C_{st} = 2150\ \mu m^2$.

Although the flicker problem of a screen is solved by one single adjustable level $V_{gc}$ after adding a basic compensation area of 105 $\mu m^2$ to the storage capacitor area of the pixel on the left portion, a chromatic aberration boundary obviously visible to the naked eye appears between the left and the center portions because of the difference between the respective storage capacitor areas of the pixels that adjoin the boundary between the left and the center portion, where the display has the same hue configuration.

It is also feasible to have the compensation area disposed on the right portion, increase the storage capacitor area of the pixel therein by a basic compensation area of 105 $\mu m$, and have the non-compensation area disposed on the left portion, depending on the manufacturing process or design of the liquid crystal display circuit. An alternative arrangement is that the compensation area is still disposed on the left portion, but the storage capacitor area of the pixel therein is added by a basic compensation area carrying a negative sign. Similarly, chromatic aberration is also found in the boundary between a portion where the storage capacitor areas are compensated for and another portion where the storage capacitor areas are not compensated for.

Figure 5:
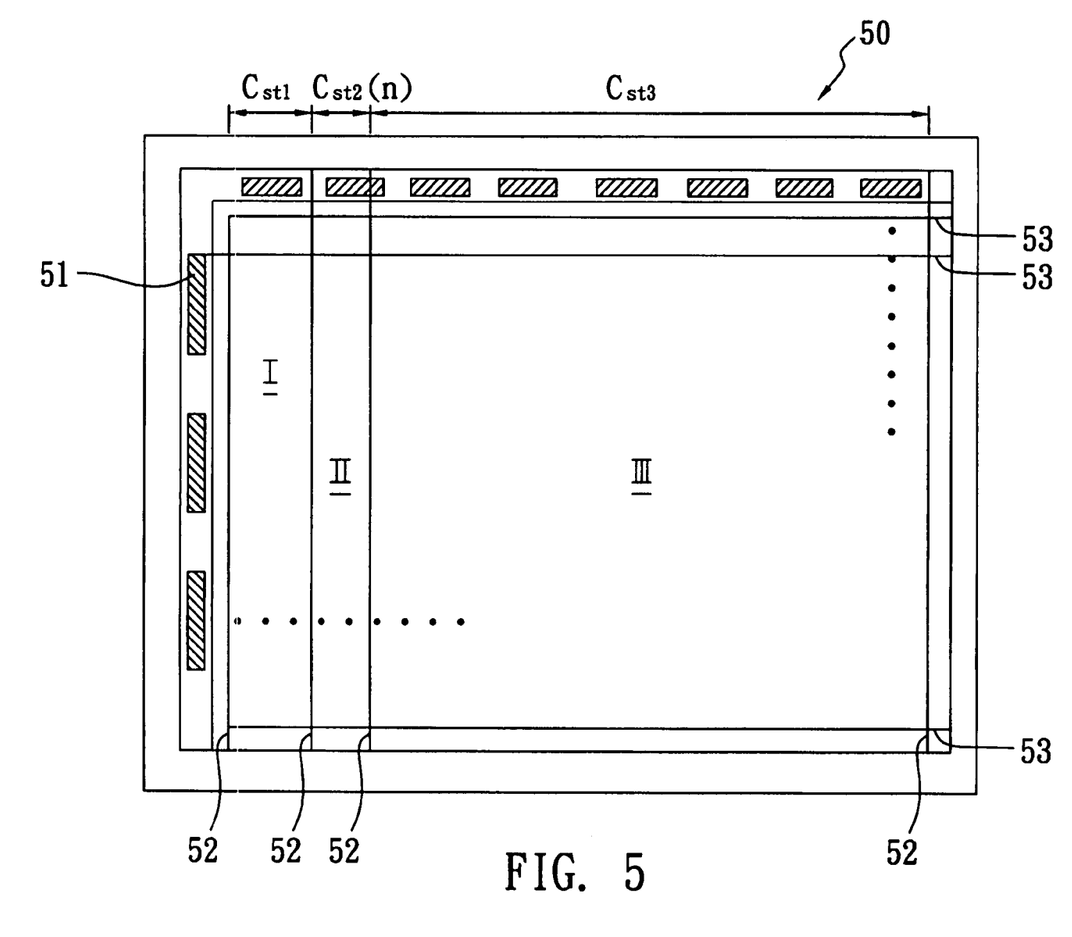
FIG. 5 is a schematic diagram of the divided portions on a liquid crystal display in accordance with the present invention.

In order to solve the aforesaid problem of the chromatic aberration boundary, a method for fuzzing the discontinuous hue gradation across a boundary between two different portions is put forth in accordance with the present invention. The method for fuzzing the hue gradation involves further dividing the left portion of the liquid crystal display 50 into a compensation portion I and a compensation transition portion II, as shown in FIG. 5. The compensation transition portion II is adjacent to the center portion. The center and the right portion are jointly known as the non-compensation portion III. The storage capacitor area $C_{st3}$ of the pixel in the non-compensation portion III is always equivalent to a constant fundamental area. The storage capacitor area $C_{st1}$ of the pixel in the compensation portion I is always greater than $C_{st3}$ by a basic compensation area $\Delta C_{st}$. On the other hand, the storage capacitor area $C_{st2}(n)$ in the compensation transition portion II is progressively decreased along the scanning line 53, or the average of storage capacitor area $C_{st2}(n)$ of the pixels on each of the data lines 52 is progressively decreased along the scanning line 53, thus the closer the storage capacitor area is to the non-compensation area III, the smaller the average storage capacitor area is. The variable n of the aforesaid function $C_{st2}(n)$ is intended to number the data lines in the compensation transition portion II in sequence. The closer a data line 52 is to the scanning driving device 51, the smaller its number is. Hence, so far the expressions that have been worked out are as follows:

$$C_{st1} \geq C_{st2}(n) \geq C_{st3};$$

$$C_{st1} = C_{st3} + \Delta C_{st};\ \text{and}$$

$$C_{st2}(n+1) \leq C_{st2}(n)$$

Figure 6:
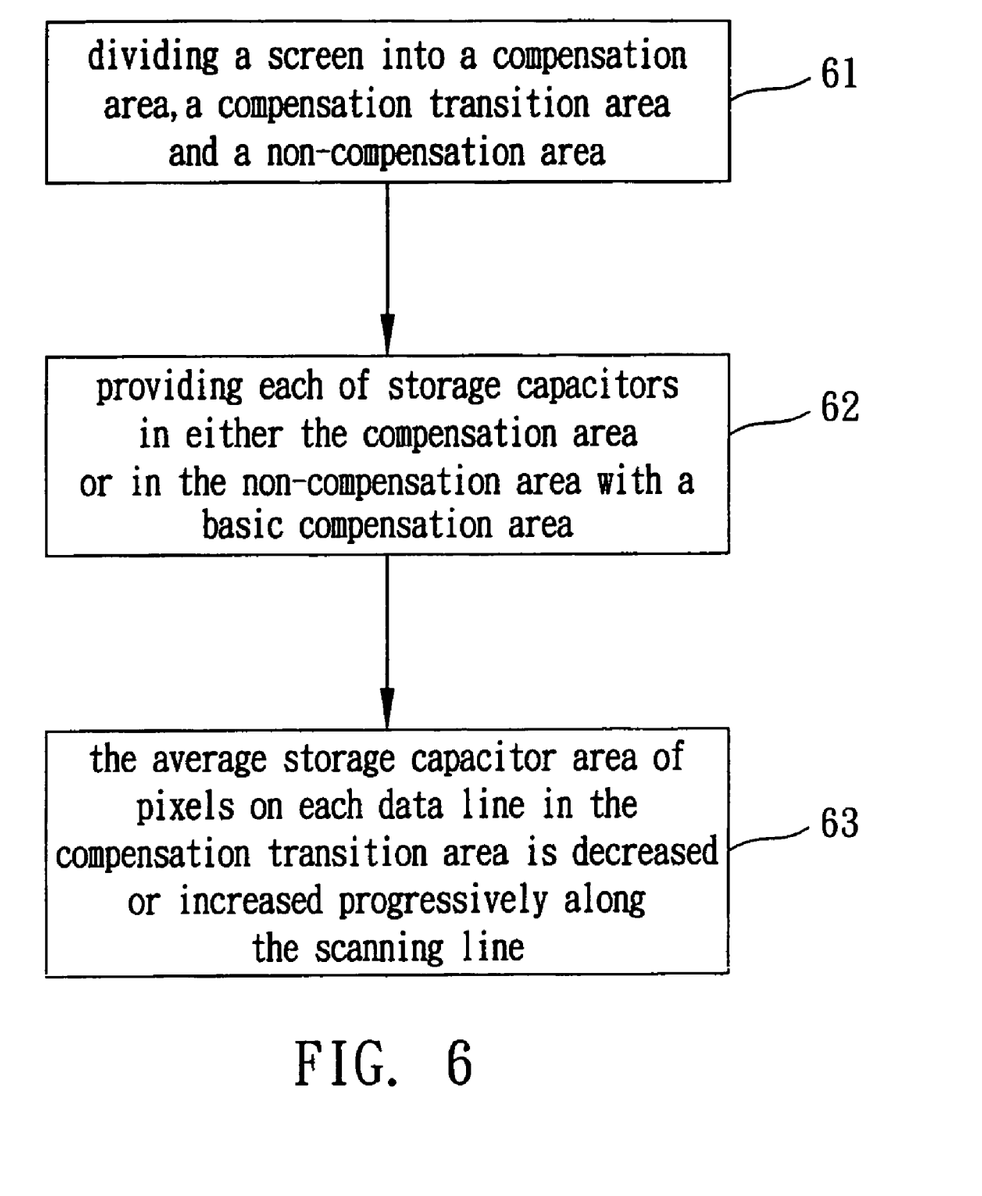
FIG. 6 is a flow chart of the embodiment in accordance with the present invention.

In short, the steps taken to implement the present invention are summarized as follows: the screen of the liquid crystal display is divided into a compensation portion, a compensation transition portion and a non-compensation portion in a sequence arranged along the scanning line, as shown in the step 61 of FIG. 6; as shown by the embodiment in FIG. 5, the screen of the liquid crystal display is divided into a compensation portion, a compensation transition portion and a non-compensation portion in a sequence arranged along the scanning line and heading toward the right, or, in other words, in a sequence arranged in the direction for moving away from the scanning driving element 51 which generates and sends scanning signals to the scanning line; as mentioned earlier, in order to meet the demand for a liquid crystal displays based on various design principles, the present invention may be designed in such a way that the screen is divided into a compensation portion, a compensation transition portion and a non-compensation portion in a sequence arranged along the scanning line and heading toward the left; as shown in the step 62 of FIG. 6, the storage capacitor area of the pixel in the compensation portion is always made either greater or smaller than the storage capacitor area of the pixel in the non-compensation portion by a constant basic compensation area, or the storage capacitor area in the compensation portion is given a basic compensation area carrying a negative sign. Finally, the average storage capacitor area of pixels on each data line in the compensation transition portion is always decreased or increased progressively along the scanning line, as shown in the step 63 of FIG. 6; in other words, the average storage capacitor area of pixels on each data line in the compensation transition portion is greater than or equal to the storage capacitor area of the pixel in the non-compensation portion but less than or equal to the storage capacitor area of the pixel in the compensation portion.

There are at least two embodiments for the method for fuzzing hue gradation in accordance with the present invention, namely processing the compensation transition portion using linear gradation and processing the compensation transition portion using random gradation. Detailed descriptions of the two embodiments are as follows:

Linear Gradation

As shown in FIG. 5, assuming the liquid crystal display 50 has a total of 3,072 data lines 52, the first data line through the $384^{th}$ data line lie in the compensation portion I, the $385^{th}$ data line through the $594^{th}$ data line lie in the compensation transition portion II, and the $595^{th}$ data line through the $3,072^{nd}$ data line lie in the non-compensation portion III.

If the basic compensation area $\Delta C_{st}$ for the storage capacitors in the compensation area I is set to 105 μm² and the fundamental area for the storage capacitors in the non-compensation portion III is set to 2,045 μm², the storage capacitor area of the pixel on the $385^{th}$ data line in the compensation transition area II is as follows:

$C_{st2}(385)=2,045$ μm²$+105$ μm²

As shown by the present embodiment, the storage capacitor area varies with an equal difference, 0.5 μm², along the scanning line. Related expressions are as follows:

$C_{st2}(386)=2,045$ μm²$+104.5$ μm²;

$C_{st2}(387)=2,045$ μm²$+104$ μm²;

. . . ; and $C_{st2}(594)=2,045$ μm²

Since the difference between the storage capacitor areas of the respective pixels of two contiguous data lines 52 is always 0.5 μm², no chromatic aberration boundary visible to the naked eye appears. However, the storage capacitors $C_{st2}(n)$ on every data line 52 in the compensation transition portion are all equal in the entire compensation area, and thus conspicuous variations in hue appearing along the scanning line 53 is likely to occur. For this reason, the alternative method, that is, random gradation, is intended to address the drawback of the aforesaid method.

Random Gradation

Figure 7:
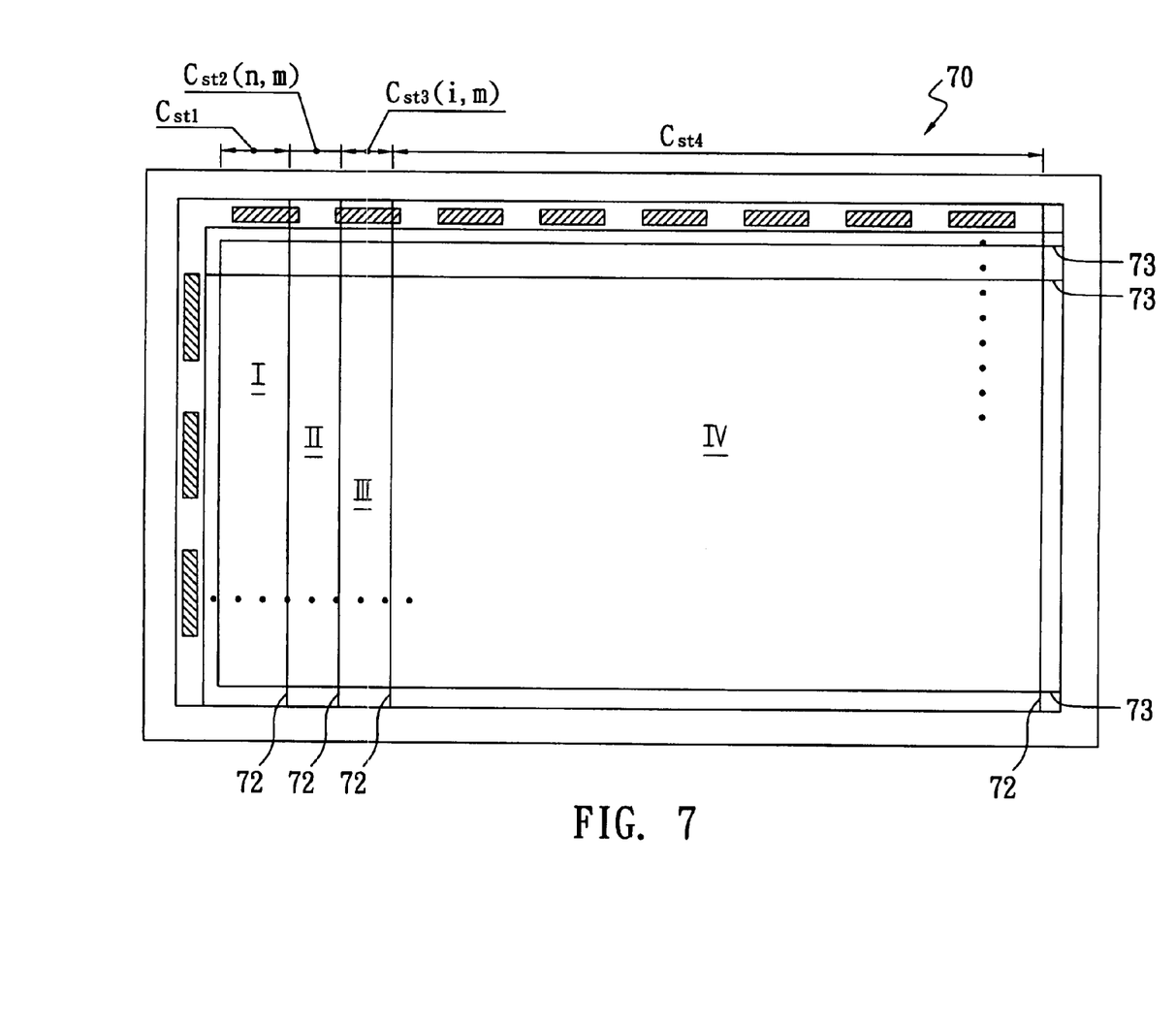
FIG. 7 is a schematic diagram of the divided portions on a liquid crystal display in accordance with another embodiment of the present invention.

As shown in FIG. 7, the liquid crystal display 70 has a total of 3,072 data lines 72, wherein the first data line through the $384^{th}$ data line lie in the compensation portion I, the $385^{th}$ data line through the $504^{th}$ data line lie in the first compensation transition portion II, the $505^{th}$ data line through the $624^{th}$ data line lie in the second compensation transition portion III, and the $625^{th}$ data line through the $3,072^{th}$ data line lie in the non-compensation portion IV. The storage capacitor areas of the pixels in these four zones are respectively denoted by $C_{st1}$, $C_{st2}(n, m)$, $C_{st3}(i, m)$ and $C_{st4}$, and they satisfy the following expressions:

$C_{st1}=2,045$ μm²$+105$ μm²;

$C_{st2}(n,m)=2,045$ μm²$+\Delta C_{st2}(n,m|105;52)$μm²;

$C_{st3}(i,m)=2,045$ μm²$+\Delta C_{st3}(i,m|52;0)$μm²;

$C_{st4}=2045$ μm²;

where n=385-504; i=505-624; m denotes the numbers given to the scanning lines 73.

$\Delta C_{st2}(n,m|105;52)$ denotes the compensation area for the pixel disposed at the intersection of the nth data line 72 and the mth scanning line 73. The compensation area for the pixels is randomly set to either 105 μm² or 52 μm² to satisfy the following expression:

$$\frac{1}{m}\sum_{m} \Delta C_{st2}(n+1, m \mid 105; 52) < \frac{1}{m}\sum_{m} \Delta C_{st2}(n, m \mid 105; 52)$$

In other words, the average compensation area for the storage capacitors of the pixels on every data line in the first compensation transition portion II is progressively decreased along the scanning line (that is, the direction in which scanning signals working on the scanning lines are transmitted). The equal difference between the average storage capacitor areas of the pixels on two contiguous data lines 72 remains as 0.5 μm² approximately.

Similarly, $\Delta C_{st3}(i,m|52;0)$ denotes the compensation area for the storage capacitors of the pixels disposed at the intersection of the ith data line 72 and the mth scanning line 73. The compensation area for the storage capacitors of the pixels is randomly set to either 52 μm² or 0 μm² to satisfy the following expression:

$$\frac{1}{m}\sum_{m} \Delta C_{st3}(i+1, m \mid 52; 0) < \frac{1}{m}\sum_{m} \Delta C_{st3}(i, m \mid 52; 0)$$

In other words, the average compensation area for the storage capacitors of the pixels on every data line in the second compensation transition portion III is progressively decreased along the scanning line. The equal difference between the average storage capacitor areas of the pixels on two contiguous data lines 72 remains 0.5 μm² approximately.

As regards another embodiment, the equal difference between the average storage capacitor areas of the pixels on two contiguous data lines 72 remains as 0.5 μm² approximately, but the storage capacitor areas of the pixels on each data line 72 remains to be in pseudo-random uniform distribution.

Figure 8:
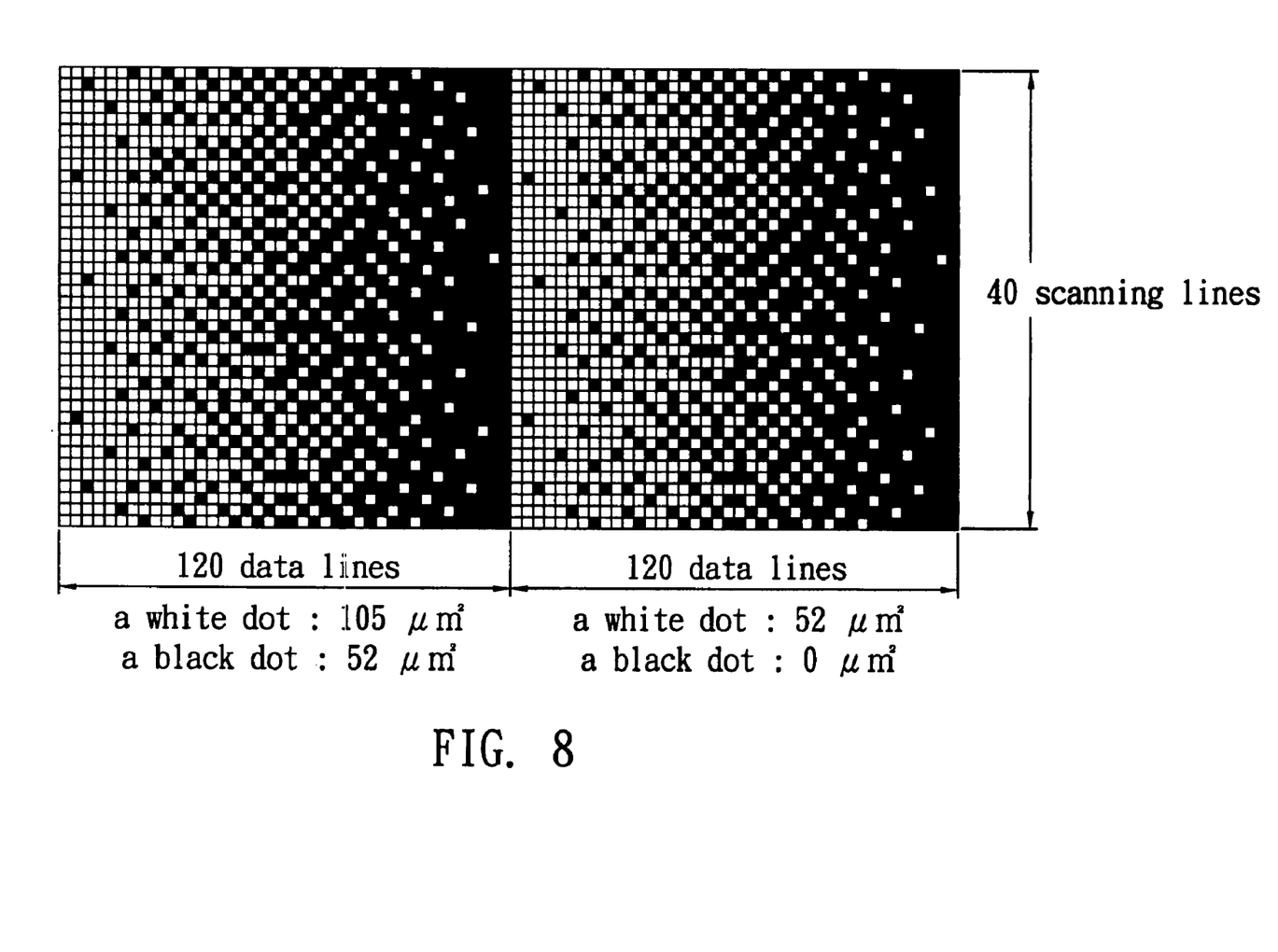
FIG. 8 is a configuration diagram of the compensation areas for the random gradation method in accordance with the present invention.

FIG. 8 is a configuration diagram of the compensation areas for the random gradation method in accordance with the present invention. An area enclosed by 40 scanning lines and 240 data lines is treated as a basic unit of the compensation transition portion. The basic unit can be replicated in the direction of the data lines successively. The 120 data lines 72 lie on the left side, which is regarded as the first compensation transition portion, whereas the 120 data lines 72 lie on the right side, which is regarded as the second compensation transition portion.

In the first compensation transition portion, there is a white dot indicating that the storage capacitors of the pixels have a compensation area of 105 μm² and a black dot indicating a compensation area of 52 μm². In the second compensation transition portion, there is a white dot indicating that the storage capacitors of the pixels have a compensation area of 52 μm² and a black dot indicating a compensation area of 0 μm². FIG. 8 clearly shows the effect of something like a mosaic intended for two-dimensional fuzzification. On the other hand, as for the liquid crystal display panel manufacturing, stepping exposure technique is, in practice, often applied to semiconductor manufacturing processes nowadays, thus the basic unit of the compensation transition portion may be treated as a basic unit for stepping exposure, or a pattern unit on a mask.

Figure 9:
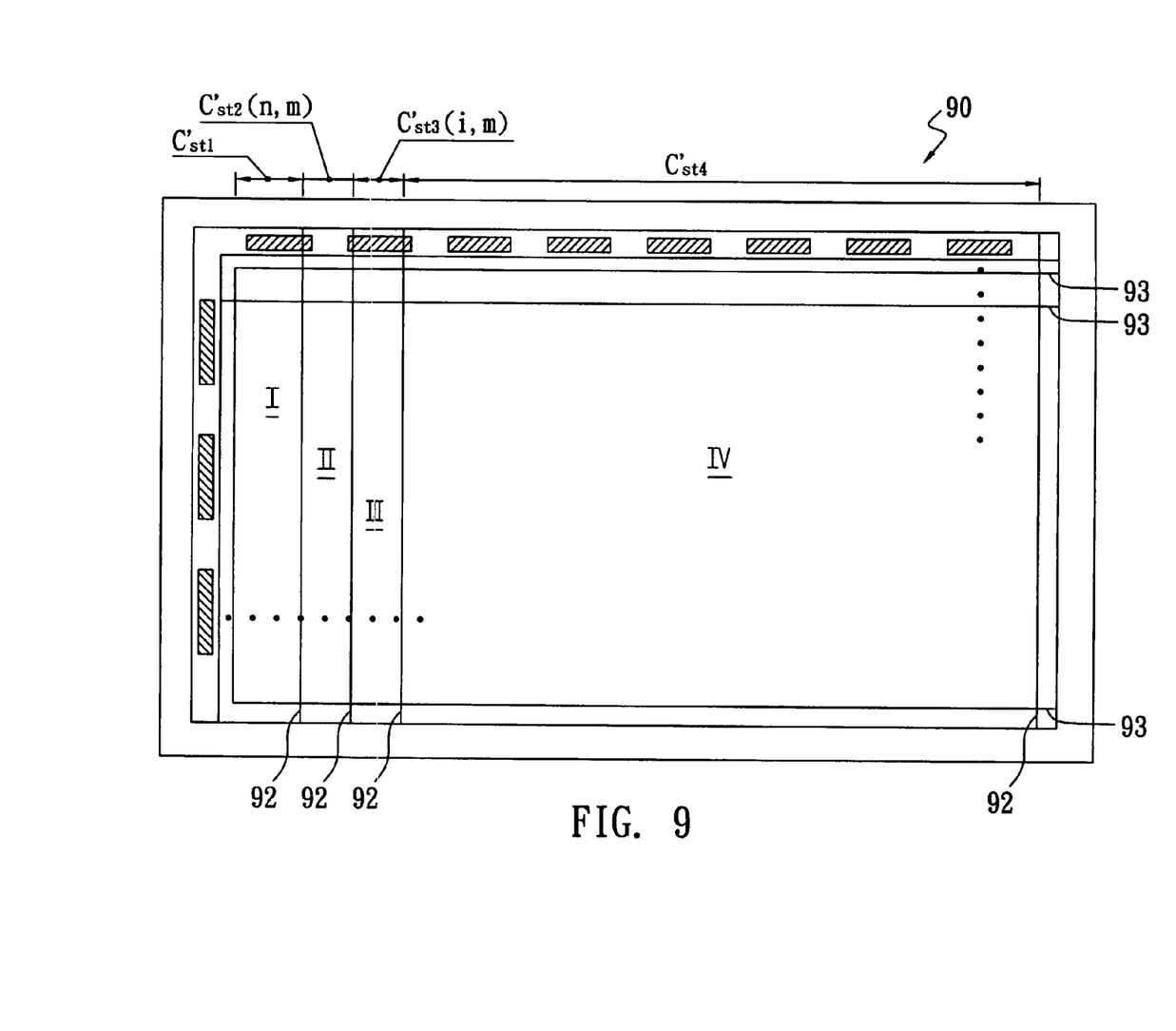
FIG. 9 is a schematic diagram of the divided portions on a liquid crystal display in accordance another embodiment of with the present invention.

As mentioned earlier, the present invention can also meet the demand for liquid crystal displays based on various design principles. For instance, a screen is divided into a compensation portion IV, a first compensation transition portion III, a second compensation transition portion II and a non-compensation portion I, in a sequence arranged along the scanning line 93 and heading toward the left, as shown in FIG. 9. The storage capacitor areas of the pixels in these four zones are respectively denoted by $C'_{st4}$, $C'_{st3}(i,m)$, $C'_{st2}(n,m)$ and $C'_{st1}$, and they satisfy the following expressions:

$C'_{st4} = 2{,}045\ \mu m^2 + 105\ \mu m^2$;

$C'_{st3}(i, m) = 2{,}045\ \mu m^2 + \Delta C_{st2}(i, m|105;52)\mu m^2$;

$C'_{st2}(n, m) = 2{,}045\ \mu m^2 + \Delta C_{st3}(n, m|52;0)\mu m^2$;

$C'_{st1} = 2{,}0451\ \mu m^2$;

where n and i respectively denote the numbers given to the data lines 92; m denotes the numbers given to the scanning lines 93.

Furthermore, $\Delta C_{st3}(i,m|105;52)$ denotes the compensation area for the pixels disposed at the intersection of the ith data line 72 and the mth scanning line 73. The compensation area for the pixels is randomly set to either 105 μm² or 52 μm² to satisfy the following expression:

$$\frac{1}{m}\sum_m \Delta C_{st3}(i+1, m \mid 105;\ 52) < \frac{1}{m}\sum_m \Delta C_{st3}(i, m \mid 105;\ 52)$$

In other words, the average compensation area for the storage capacitors of the pixels on every data line in the first compensation transition portion III is progressively decreased along the scanning line (that is, in the direction opposite to the direction in which scanning signals working on the scanning lines are transmitted). The equal difference between the average storage capacitor areas of the pixels on two contiguous data lines 92 remains as 0.51 μm² approximately.

Similarly, $\Delta C_{st2}(n,m|52;0)$ denotes the compensation area for the storage capacitor of the pixel disposed at the intersection of the nth data line 92 and the mth scanning line 93. The compensation area for the storage capacitors of the pixels is randomly set to either 52 μm² or 0 μm² to satisfy the following expression:

$$\frac{1}{m}\sum_m \Delta C_{st2}(n+1, m \mid 52;\ 0) < \frac{1}{m}\sum_m \Delta C_{st2}(n, m \mid 52;\ 0)$$

In other words, the average compensation area for the storage capacitors of the pixels on every data line in the second compensation transition portion II is progressively decreased along the scanning line. The equal difference between the average storage capacitor areas of the pixels on two contiguous data lines 92 remains as 0.5 μm² approximately.

As shown by the present embodiment, the equal difference between the average storage capacitor areas of the pixels on two contiguous data lines 92 remains as 0.5 μm² approximately, but the storage capacitor areas of the pixels on each data line 92 remains to be in pseudo-random uniform distribution.

Figure 10:
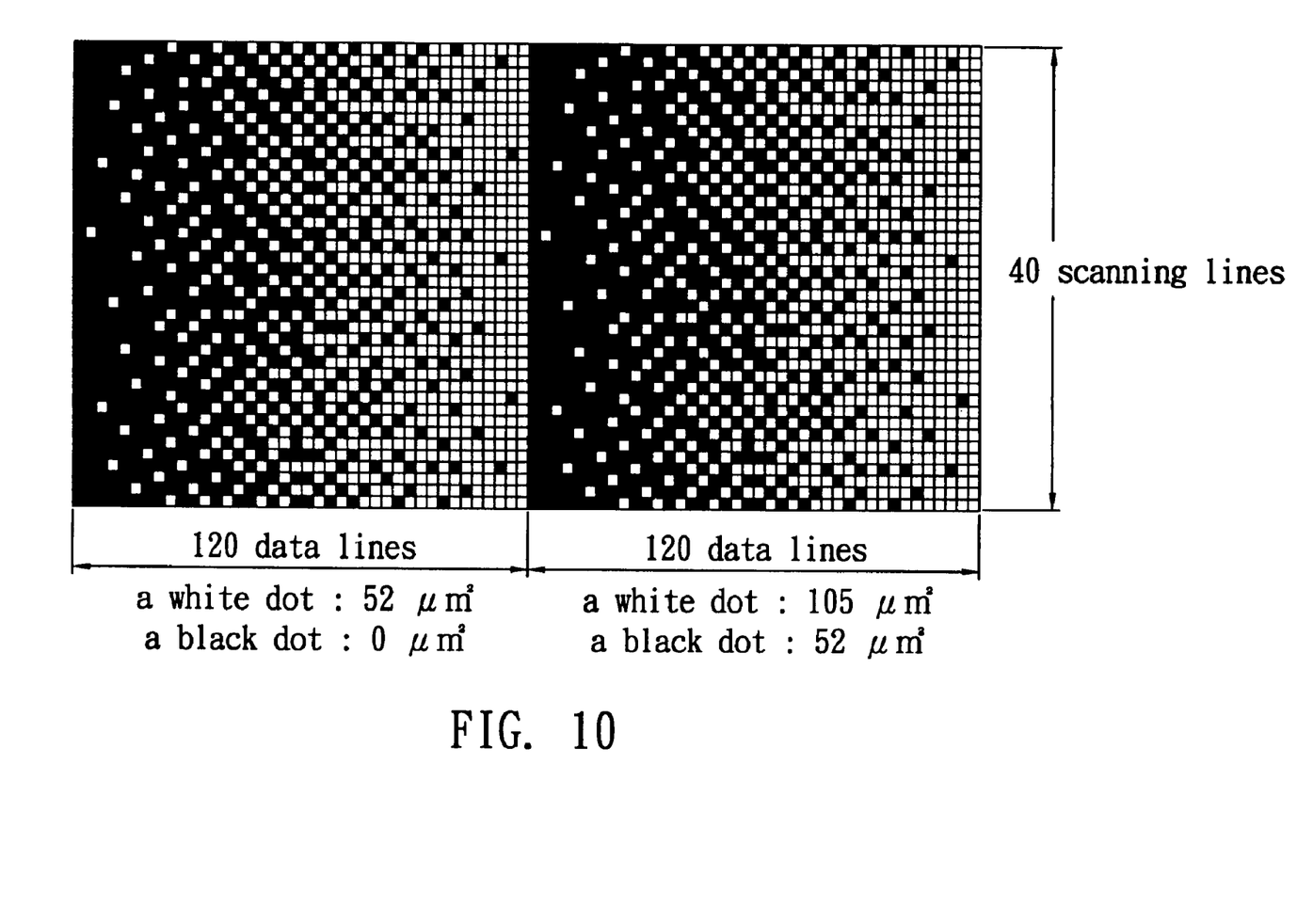
FIG. 10 is a configuration diagram of the compensation areas for the random gradation method in accordance with another embodiment of the present invention.

FIG. 10 is a configuration diagram of the compensation areas for the random gradation method in accordance with the present invention. An area enclosed by 40 scanning lines and 240 data lines is treated as a basic unit of the compensation transition portion. The basic unit can be replicated in the direction of the data lines successively. The 120 data lines 92 lie on the right side, which is regarded as the first compensation transition portion, whereas the 120 data lines 92 lie on the left side, which is regarded as the second compensation transition portion.

In the first compensation transition portion, there is a white dot indicating that the storage capacitors of the pixels have a compensation area of 105 μm² and a black dot indicating a compensation area of 52 μm². In the second compensation transition portion, there is a white dot indicating that the storage capacitors of the pixels have a compensation area of 52 μm² and a black dot indicating a compensation area of 0 μm². FIG. 10 clearly shows the effect of some thing like a mosaic intended for two-dimensional fuzzification.

The above-described embodiments of the present invention are intended to be illustrative only. Numerous alternative embodiments may be is devised by persons skilled in the art without departing from the scope of the following claims.

What is claimed is:

1. A method for eliminating flickers of a liquid crystal display comprising:
    dividing a screen of the liquid crystal display into a compensation portion and a compensation transition portion and a non-compensation portion in a sequence arranged along a scanning line; and
    gradually varying an average value of storage capacitances of pixels on each data line in the compensation transition portion along the scanning line, wherein the storage capacitances of pixels on each of the scanning lines are gradually varied from pixel to pixel.

2. The method as claimed in claim 1, further comprising:
providing each of storage capacitors in the compensation portion, each of the storage capacitors having a basic compensation area.

3. A method for eliminating flickers of a liquid crystal display comprising:
dividing a screen of the liquid crystal display into a compensation portion and a compensation transition portion and a non-compensation portion in a sequence arranged along a scanning line; and
gradually varying an average value of storage capacitor areas of pixels on each data line in the compensation transition portion along the scanning line, wherein the storage capacitor areas of pixels on each of the scanning lines are gradually varied from pixel to pixel.

4. The method as claimed in claim 3, further comprising:
providing storage capacitors in the compensation portion, each of the storage capacitors having a basic compensation area.

5. The method as claimed in claim 3, further comprising:
applying a gate pulse compensation level to the scanning lines.

6. The method as claimed in claim 3, wherein the storage capacitor areas of the pixels on each data line in the compensation transition portion exhibit a pseudo-random uniform distribution.

7. The method as claimed in of claim 3, wherein the storage capacitor area of the pixels in the compensation transition portion is determined by randomly selecting one from a group of constant values.

8. The method as claimed in claim 7, wherein the constant values are zero or multiples of a divisor for dividing the basic compensation area with no remainder.

9. The method as claimed in claim 3, further comprising:
dividing the compensation transition portion into a plurality of sub-areas, wherein the storage capacitor areas between the sub-areas are determined by different compensation formulas.

10. The method as claimed in claim 9, wherein the sub-areas are equal parts into which the compensation transition portion is divided into equal parts along the data line by the sub-areas.

11. The method as claimed in claim 10, wherein the storage capacitor area of the pixel in each of the sub-areas has a compensation area determined by randomly selecting one from a group of constant values.

12. The method as claimed in claim 11, wherein the constant values are zero or multiples of a divisor for dividing the basic compensation area with no remainder.

13. The method as claimed in of claim 3, wherein the storage capacitor area of the pixel in the compensation portion is larger than the storage capacitor area in the non-compensation portion around a value of the basic compensation area, and the average storage capacitor area of the pixels on each data line in the compensation transition portion decreases progressively along the direction from the compensation portion to the non-compensation portion.

14. The method as claimed in claim 3, wherein the storage capacitor area of the pixel in the compensation portion is smaller than the storage capacitor area in the non-compensation portion around a value of the basic compensation area, and the average of the storage capacitor areas in the compensation transition portion increases progressively along the direction from the compensation portion to the non-compensation portion.

15. The method as claimed in claim 3, wherein the direction along the scanning line is designated as either the direction in which scanning signals are transmitted or the direction opposite thereto.

16. A method for eliminating flickers of a liquid crystal displays comprising:
dividing a screen of the liquid crystal display into a compensation portion and a compensation transition portion and a non-compensation portion in a sequence arranged along a scanning line;
providing each of storage capacitors either in the compensation portion or in the non-compensation portion with a basic compensation area; and
gradually varying an average storage capacitor area of pixels on each data line in the compensation transition portion along the scanning line, wherein the storage capacitor areas of pixels on each of the scanning lines are gradually varied from pixel to pixel;
wherein the storage capacitor areas of the pixels on each data line in the compensation transition area exhibit a pseudo-random uniform distribution.

17. The method as claimed in claim 16, further comprising;
applying a gate pulse compensation level to the scanning lines.

18. The method as claimed in claim 16, wherein the storage capacitor area of the pixel in the compensation transition portion is determined by randomly selecting one from a plurality of constant values.

19. The method as claimed in claim 18, wherein the constant values are zero or multiples of a divisor for dividing the basic compensation area with no remainder.

20. The method as claimed in claim 16, wherein the storage capacitor area of the pixel in the compensation portion is larger than the storage capacitor area of the pixel in the non-compensation portion around a value of the basic compensation area, and the average storage capacitor area in the compensation transition portion decreases progressively along the direction from the compensation portion to the non-compensation portion.

21. The method as claimed in claim 16, wherein the storage capacitor area of the pixel in the compensation portion is smaller than the storage capacitor area of the pixel in the non-compensation portion around a value of the basic compensation area, and the average storage capacitor area of the pixels on each data line in the compensation transition portion increases progressively along the direction from the compensation portion to the non-compensation portion.

22. The method as claimed in claim 16, wherein the direction along the scanning line is designated as either the direction in which scanning signals are transmitted or the direction opposite thereto.

23. A method for eliminating flickers of a liquid crystal display comprising:
dividing a screen of the liquid crystal display into a compensation portion and a compensation transition portion and a non-compensation portion in a sequence arranged along a scanning line;
providing each of storage capacitors either in the compensation portion or in the non-compensation portion with a basic compensation area; and
gradually varying an average storage capacitor area of pixels on each data line in the compensation transition portion along the direction from the compensation portion to the non-compensation portion with an equal difference, wherein the storage capacitor areas of pixels on each of the scanning lines are gradually varied with equal difference from pixel to pixel.

24. The method as claimed in claim 23, further comprising:

applying a gate pulse compensation level to the scanning lines.

25. The method as claimed in claim 23, wherein the storage capacitor area of the pixel in the compensation portion is larger than the storage capacitor area of the pixel in the non-compensation portion around a value of the basic compensation area, and the average storage capacitor area of the pixels on each data line in the compensation transition portion decreases progressively along the direction from the compensation portion to the non-compensation portion.

26. The method as claimed in claim 23, wherein the storage capacitor area of the pixel in the compensation portion is smaller than the storage capacitor area of the pixel in the non-compensation portion around the value of the basic compensation area, and the average storage capacitor area of the pixels on each data line in the compensation transition portion increases progressively along the direction from the compensation portion to the non-compensation portion.

27. The method as claimed in claim 23, wherein the direction along the scanning line is designated as either the direction in which scanning signals are transmitted or the direction opposite thereto.

28. The method as claimed in claim 3, wherein the storage capacitor areas of the pixels on each data line in the compensation transition portion progressively vary with an equal difference.

* * * * *